(12) United States Patent
DiFrancesco et al.

(10) Patent No.: US 8,137,633 B2
(45) Date of Patent: Mar. 20, 2012

(54) COMPOSITIONS AND METHODS FOR TREATING EXHAUST GASES

(75) Inventors: Chris E. DiFrancesco, Durham, NC (US); Kozo Iida, Hiroshima (JP)

(73) Assignee: Cormetech, Inc., Durham, NC (US)

( * ) Notice: Subject to any disclaimer, the term of this patent is extended or adjusted under 35 U.S.C. 154(b) by 0 days.

(21) Appl. No.: 12/944,154

(22) Filed: Nov. 11, 2010

(65) Prior Publication Data

US 2011/0172090 A1    Jul. 14, 2011

(51) Int. Cl.
*B01D 53/86* (2006.01)
(52) U.S. Cl. .................. 422/168; 422/177; 422/180
(58) Field of Classification Search .................. 502/325; 422/168, 177, 180
See application file for complete search history.

(56) References Cited

U.S. PATENT DOCUMENTS

| 7,658,898 | B2 * | 2/2010 | DiFrancesco et al. | ..... 423/213.2 |
| 7,833,932 | B1 * | 11/2010 | DiFrancesco et al. | ........ 502/325 |
| 2009/0304559 | A1 * | 12/2009 | Steichen et al. | ............. 422/177 |

* cited by examiner

*Primary Examiner* — Timothy Vanoy
(74) *Attorney, Agent, or Firm* — J. Clinton Wimbish; Smith Moore Leatherwood LLP

(57) ABSTRACT

The present invention provides compositions, systems, and methods for achieving high efficiencies of nitrogen oxide (NOx) removal from exhaust gases while minimizing ammonia slip and sulfur dioxide oxidation. In one embodiment, a method of removing nitrogen oxides from an exhaust gas comprises providing a first catalyst layer, adding an ammonia-containing compound to the exhaust gas upstream of the first catalyst layer in excess of the stoichiometric equivalent of the nitrogen oxides in the exhaust gas, flowing the exhaust gas through the first catalyst layer, selectively catalytically decomposing ammonia in excess of the stoichiometric reaction equivalent of the nitrogen oxides in the exhaust gas, and catalytically reducing the nitrogen oxides by reaction with ammonia not selectively catalytically decomposed.

23 Claims, 4 Drawing Sheets

COMPOSITIONS AND METHODS FOR TREATING EXHAUST GASES

PRIOR RELATED U.S. APPLICATIONS DATA

The present application hereby claims priority under 35 U.S.C. §120 to U.S. patent application Ser. No. 12/702,010, filed Feb. 8, 2010, now U.S. Pat. No. 7,833,932, which is a continuation application of U.S. patent application Ser. No. 11/888,640 filed Aug. 1, 2007, now U.S. Pat. No. 7,658,898, which claims priority under 35 U.S.C. §119(e) to U.S. Provisional Patent Application Ser. No. 60/834,614 filed Aug. 1, 2006, which are each incorporated by reference in their entireties.

FIELD OF THE INVENTION

The present invention relates to compositions and methods for treating exhaust gases and, in particular, to the removal of nitrogen oxides from exhaust gases.

BACKGROUND OF THE INVENTION

The hazards of nitrogen oxides and their role in the formation of acid rain and tropospheric ozone have resulted in the imposition of strict standards limiting the discharges of these chemical species. To meet these standards, it is generally necessary to remove at least part of these oxides present in the exhaust gases from stationary or mobile combustion sources.

Denitrification or selective catalytic reduction (SCR) technology is commonly applied to combustion-derived flue gases for removal of nitrogen oxides. The denitrification reaction comprises the reaction of nitrogen oxide species in the gases, such as nitrogen oxide (NO) or nitrogen dioxide ($NO_2$), with a nitrogen containing reductant, such as ammonia or urea, resulting in the production of benign diatomic nitrogen ($N_2$) and water.

In a typical application, catalyst responsible for conducting the reduction of nitrogen oxides is installed in the path of the flue gas flow and ammonia is injected upstream of the catalyst. The SCR system, including the housing, catalyst bed, ammonia injection system controls, and mixing and/or flow control devices, is designed to remove a certain amount of NOx, while staying within a specified maximum level of $NH_3$ slip downstream of the catalyst, a maximum level of oxidation of $SO_2$ (sulfur dioxide) to $SO_3$ (sulfur trioxide), and a maximum pressure loss across the catalyst. Ammonia slip, as used herein, refers to the amount of ammonia present in the exhaust gas stream at the outlet of a catalyst.

Sulfur dioxide oxidation is an undesirable side reaction promoted by SCR catalysts. The maximum limit for sulfur dioxide oxidation is specified to minimize the increase in sulfur trioxide downstream of the catalyst. Increased levels of sulfur trioxide can contribute to fouling of downstream equipment, can result in a visible plume at the exhaust stack of the combustion facility and increase particulate matter emissions.

Similarly, a maximum level of ammonia slip is specified to limit emissions of ammonia from the exhaust, and also to prevent the formation of ammonia salts, such as ammonium bisulfate that result from reaction between ammonia and other flue gas components such as sulfur trioxide. Ammonia salts can foul downstream equipment.

In SCR processes, the reaction between NOx and $NH_3$ generally occurs at a stoichiometry of one mole of NOx per one mole of ammonia:

$$4NO + 4NH_3 + O_2 \rightarrow 4N_2 + 6H_2O \tag{1}$$

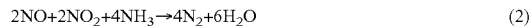

$$2NO + 2NO_2 + 4NH_3 \rightarrow 4N_2 + 6H_2O \tag{2}$$

The reaction is not thermodynamically limited at typical SCR temperatures, so if the molar ratio of $NH_3$ to NOx (or $NH_3$/NOx) at the catalyst inlet is 1.0 and a sufficient amount of catalyst is present, the reduction of NOx and consumption of ammonia both approach 100%, and there is essentially no NOx and no ammonia slip at the outlet of the catalyst. If the molar ratio is less than 1.0 and a sufficient amount of catalyst is present, then the NOx reduction efficiency approaches the molar ratio and the ammonia slip approaches zero. If the molar ratio is greater than 1.0 and a sufficient amount of catalyst is present, then NOx reduction efficiency approaches 100% and all excess ammonia slips past the catalyst.

In actual applications, however, it is difficult to attain a consistent molar ratio of $NH_3$/NOx across the entire catalyst bed. There is typically a heterogeneous distribution of $NH_3$/NOx across the catalyst bed stemming from several factors including a heterogeneous distribution of NOx in the exhaust gas, addition of the ammonia at discrete points upstream of the catalyst bed as well as imperfect mixing of the $NH_3$ and NOx downstream of these addition points.

Several techniques currently exist for reducing heterogeneous distributions of $NH_3$/NOx across a catalyst bed. Ammonia flow to discrete points, for example, can be biased to match the molar flow of NOx as determined by the NOx concentration and flow at a particular section. Sufficient mixing length and static mixers are additionally employed downstream of the ammonia injection points in order to obtain mixing prior to the catalyst bed. With these measures in place, in some cases, NOx reduction efficiencies of 93% and 3 ppmvd ammonia slip have been achieved.

Achieving higher NOx reductions (i.e. >95%), nevertheless, remains limited by the heterogeneous distribution of the $NH_3$/NOx molar ratio across the catalyst bed. $NH_3$/NOx molar ratios in excess of equivalence (1.0) can be run to obtain high NOx reduction efficiencies. $NH_3$/NOx molar ratios in excess of equivalence, however, result in undesirable ammonia slip. Moreover, attempts to limit such slip with additional catalytic structures can result in undesirable oxidation of sulfur dioxide.

In view of these problems, it would be desirable to provide compositions and methods for removing nitrogen oxides from exhaust gases operable to achieve high efficiencies while minimizing ammonia slip. It would additionally be desirable to provide compositions and methods for removing nitrogen oxides from exhaust gases operable to achieve high efficiencies while minimizing ammonia slip and sulfur dioxide oxidation.

SUMMARY OF THE INVENTION

The present invention provides compositions, systems, and methods for achieving high efficiencies of NOx removal from exhaust gases while minimizing ammonia slip and sulfur dioxide oxidation.

In one embodiment, the present invention provides a composition comprising a monolithic structural catalyst body comprising a uniform composition, the uniform composition comprising 50-99.9% by weight an inorganic oxide composition and a catalytically active metal functional group comprising ruthenium. In some embodiments, the uniform chemical composition comprises at least 0.01% by weight a catalytically active metal group comprising ruthenium. In some embodiments, the uniform composition comprises from about 0.01% to about 5% by weight a catalytically active metal functional group comprising ruthenium. In other embodiments, the uniform composition comprises greater than 1% to about 5% by weight a catalytically active metal functional group comprising ruthenium. In a further embodiment, the uniform composition comprises from about 0.01% to 0.2% or from 0.6% to 0.9% by weight a catalytically active metal functional group comprising ruthenium. In one embodiment, the uniform composition comprises greater than about 5% by weight or less than about 0.01% by weight a catalytically active metal functional group comprising ruthenium.

In some embodiments, the catalytically active metal functional group of a structural catalyst body of the present invention further comprises metals in addition to ruthenium, including, but not limited to, vanadium pentoxide ($V_2O_5$), tungsten oxide ($WO_3$), molybdenum oxide ($MoO_3$), promoted titanium (Ti) species, platinum group metals, gold, silver, iridium, cerium, other transition and noble metals, and/or mixtures thereof. In some embodiments, the additional metals are part of the uniform composition used to form the structural catalyst body. In other embodiments, catalytic material comprising the additional metals can be incorporated into the structural catalyst body as part of one or more coatings applied to a surface of the catalyst body. In another embodiment, catalytic material comprising the additional metals can be incorporated into the structural catalyst body by impregnation.

In some embodiments, a monolithic structural catalyst body comprises an inert carrier on which a catalytically active metal functional group comprising ruthenium is disposed. The inert carrier, in some embodiments, can be coated or impregnated with the catalytically active metal functional group comprising ruthenium. Moreover, catalytic material comprising additional metals as provided herein can be disposed over the catalytic ruthenium composition by additional coatings or impregnations.

In another aspect, the present invention provides systems for removing nitrogen oxides from an exhaust gas. In one embodiment, a system for removing nitrogen oxides from an exhaust gas comprises an ammonia decomposition catalyst layer and a nitrogen oxide reduction catalyst layer downstream of the ammonia decomposition catalyst layer. Ammonia decomposition, as used herein, refers to the reaction of ammonia with oxygen to produce nitrogen, water, and/or nitrogen oxides. In some embodiments of systems of the present invention, the ammonia decomposition catalyst layer is the first catalyst layer with which an exhaust gas comes into contact for removal of nitrogen oxides. Moreover, in some embodiments, an additional nitrogen oxide reduction catalyst layer is provided upstream of the ammonia decomposition layer.

In some embodiments of systems of the present invention for removing nitrogen oxides from an exhaust gas, there is also provided at least one addition point of an ammonia-containing compound upstream of the ammonia decomposition and/or nitrogen oxide reduction catalyst layers.

An ammonia-containing compound, as used herein, comprises ammonia ($NH_3$) or any other chemical compound containing nitrogen that can decompose or react to form ammonia prior to contact with the catalyst or upon contact with the catalyst, including, but not limited to, urea [$CO(NH_2)_2$], cyanuric acid [2,4,6-trihydroxy-1,3,5-triazine], or isocyanic acid [HNCO]. The ammonia-containing compound, in some embodiments, comprises combinations of ammonia and other ammonia-containing compounds, and may be added in any form including aqueous mixtures. In some embodiments, an ammonia-containing compound comprises excess ammonia from upstream selective non-catalytic reduction (SNCR) or selective auto-catalytic reduction (SACR) techniques and can be optionally mixed with one or more additional ammonia-containing compounds.

In another embodiment, a system for removing nitrogen oxides from an exhaust gas comprises a catalyst layer operable to effectuate both ammonia decomposition and nitrogen oxide reduction thereby rendering additional upstream or downstream catalyst layers optional or unnecessary. In such embodiments, the catalyst layer comprises at least one monolithic structural catalyst body of the present invention.

In another aspect, the present invention provides methods of removing nitrogen oxides from an exhaust gas. In some embodiments, a method of removing nitrogen oxides from an exhaust gas comprises providing an ammonia decomposition catalyst layer, providing a nitrogen oxide reduction catalyst layer downstream of the ammonia decomposition catalyst layer, adding an ammonia-containing compound upstream of the catalyst layers in an amount not less than the stoichiometric equivalent of nitrogen oxides in the exhaust gas, and passing the exhaust gas through the ammonia decomposition catalyst layer and passing the exhaust gas through the nitrogen oxide reduction catalyst layer. In some embodiments of methods of the present invention, the ammonia decomposition catalyst layer is the first catalyst layer with which an exhaust gas comes into contact for removal of nitrogen oxides.

In another embodiment, a method of removing nitrogen oxides from an exhaust gas comprises providing a first catalyst layer, catalytically decomposing ammonia in the exhaust gas and catalytically reducing nitrogen oxides in the exhaust gas by passing the exhaust gas through the first catalyst layer, wherein an ammonia-containing compound is added upstream of the first catalyst layer in an amount not less than the stoichiometric reaction equivalent of nitrogen oxides in the exhaust gas. In some embodiments, the amount of ammonia exiting the first catalyst layer is less than about 5 ppmvd. In other embodiments, the amount of ammonia exiting the first catalyst layer is less than about 3 ppmvd. In a further embodiment, the amount of ammonia exiting the first catalyst layer is less than about 2 ppmvd. In some embodiments, the method further comprises providing at least one additional nitrogen oxide reduction catalyst layer downstream of the first catalyst layer and flowing the exhaust gas through the at least one additional nitrogen oxide reduction catalyst layer.

In another embodiment, a method of removing nitrogen oxides from an exhaust gas comprises providing a first catalyst layer, adding an ammonia-containing compound to the exhaust gas upstream of the first catalyst layer in excess of the stoichiometric reaction equivalent of nitrogen oxides in the exhaust gas, flowing the exhaust gas through the first catalyst layer, selectively catalytically decomposing ammonia in excess of the stoichiometric reaction equivalent of the nitrogen oxides in the exhaust gas, and catalytically reducing the nitrogen oxides by reaction with ammonia not selectively catalytically decomposed. In some embodiments, the amount of ammonia exiting the first catalyst layer is less than about 5 ppmvd. In other embodiments, the amount of ammonia exiting the first catalyst layer is less than about 3 ppmvd. In one embodiment, the amount of ammonia exiting the first catalyst layer is less than about 2 ppmvd. In some embodiments, the method further comprises providing at least one additional nitrogen oxide reduction catalyst layer downstream of the first catalyst layer and flowing the exhaust gas through the at least one additional nitrogen oxide reduction catalyst layer.

In a further embodiment, a method of removing nitrogen oxides from an exhaust gas comprises providing a first catalyst layer, adding an amount of ammonia-containing compound to the exhaust gas, flowing the exhaust gas through the first catalyst layer wherein the amount of ammonia-containing compound added produces a $NH_3/NOx$ molar ratio in excess of equivalence at one or more points in the first catalyst layer, selectively catalytically decomposing ammonia in excess of equivalence at the one or more points in the first catalyst layer, and catalytically reducing nitrogen oxides by reaction with ammonia not selectively catalytically decomposed. In some embodiments, the amount of ammonia exiting the first catalyst layer is less than about 5 ppmvd. In other embodiments, the amount of ammonia exiting the first catalyst layer is less than about 3 ppmvd. In one embodiment, the amount of ammonia exiting the first catalyst layer is less than about 2 ppmvd. In some embodiments, the method further comprises providing at least one additional nitrogen oxide reduction catalyst layer downstream of the first catalyst layer and flowing the exhaust gas through the at least one additional nitrogen oxide reduction catalyst layer.

In some embodiments, wherein at least one additional nitrogen oxide reduction catalyst layer is provided downstream of the first catalyst layer, the amount of ammonia in the exhaust gas exiting the at least one additional catalyst layer is less than about 5 ppmvd, less than about 3 ppmvd, or less than about 2 ppmvd.

Systems and methods for removing nitrogen oxides from exhaust gases, according to embodiments of the present invention, can demonstrate nitrogen oxide removal efficiencies of at least 95%. In some embodiments, systems and methods of the present invention can display a nitrogen oxide removal efficiency of at least 97%. In one embodiment, systems and methods of the present invention can display a nitrogen oxide removal efficiency of at least 99%.

As provided herein, in some embodiments, an ammonia-containing compound is added in systems and methods of the present invention in an amount sufficient to produce a $NH_3/NOx$ molar ratio at the inlet of a catalyst layer having a value not less than equivalence (1.0).

In some embodiments, an ammonia-containing compound is added upstream of one or more catalyst layers to produce a $NH_3/NOx$ molar ratio in excess of equivalence at the inlet of the catalyst. In some embodiments, an ammonia-containing compound is added upstream of a catalyst layer to produce a $NH_3/NOx$ molar ratio at the inlet of the catalyst ranging from greater than 1.0 to about 2.0 or greater than 1.0 to about 1.5. In one embodiment, an ammonia-containing compound is added in an amount sufficient to produce a $NH_3/NOx$ molar ratio at the inlet of the catalyst ranging from about 0.95 to about 1.5 or from about 1.5 to about 2.0. In another embodiment, an ammonia-containing compound is added in an amount sufficient to produce a $NH_3/NOx$ molar ratio ranging from about 1.0 to about 1.4. In a further embodiment, ammonia-containing compound is added in an amount sufficient to produce a $NH_3/NOx$ molar ratio at the inlet of the catalyst ranging from about 1.0 to about 1.2.

Moreover, in some embodiments, an ammonia-containing compound is added to an exhaust gas in systems and methods of the present invention in an amount sufficient to produce a $NH_3/NOx$ molar ratio in excess of equivalence at one or more points within a catalyst layer. In some embodiments, an ammonia-containing compound is added in an amount sufficient to produce a $NH_3/NOx$ molar ratio at one or more points within a catalyst layer ranging from greater than 1.0 to about 2.0 or from greater than 1.0 to about 1.5. In another embodiment, an ammonia-containing compound is added in an amount sufficient to produce a $NH_3/NOx$ molar ratio at one or more points in a catalyst layer ranging from greater than 1.0 to about 1.3 or ranging from about 1.5 to about 2.0.

In some embodiments, a $NH_3/NOx$ molar ratio in excess of equivalence at one or more points within a catalyst layer can be achieved by the addition of an ammonia-containing compound to an exhaust gas in an amount less than or equal to the stoichiometric reaction equivalent of nitrogen oxides in the exhaust gas. In another embodiment, a $NH_3/NOx$ molar ratio in excess of equivalence at one or more points within a catalyst layer can be achieved by the addition of an ammonia containing compound to an exhaust gas in an amount greater than the stoichiometric reaction equivalent of nitrogen oxides in the exhaust gas.

In some embodiments of the present invention, exhaust gases treated with systems and methods described herein further comprise a sulfur trioxide content. Systems and methods of the present invention for removing nitrogen oxides from an exhaust gas, in some embodiments, result in no increase or substantially no increase of the sulfur trioxide content of the exhaust gas through the oxidation of sulfur dioxide.

Accordingly, it is an object of the present invention to provide compositions, systems, and methods with increased efficiencies for the removal of nitrogen oxides in exhaust gases while maintaining minimal ammonia slip.

It is another object of the present invention to provide compositions, systems, and methods operable to selectively decompose ammonia in excess of the stoichiometric reaction equivalent of nitrogen oxides in an exhaust gas while maintaining high efficiencies of nitrogen oxide removal from the exhaust gas.

It is a further object of the present invention to provide compositions, systems, and methods for increased efficiencies for the removal of nitrogen oxides in exhaust gases without resulting in increased sulfur dioxide oxidation.

These and other embodiments of the present invention are described in greater detail in the detailed description which follows. These and other objects, features and advantages of the present invention will become apparent after a review of the following detailed description of the disclosed embodiments and claims.

DETAILED DESCRIPTION

Figure 1:
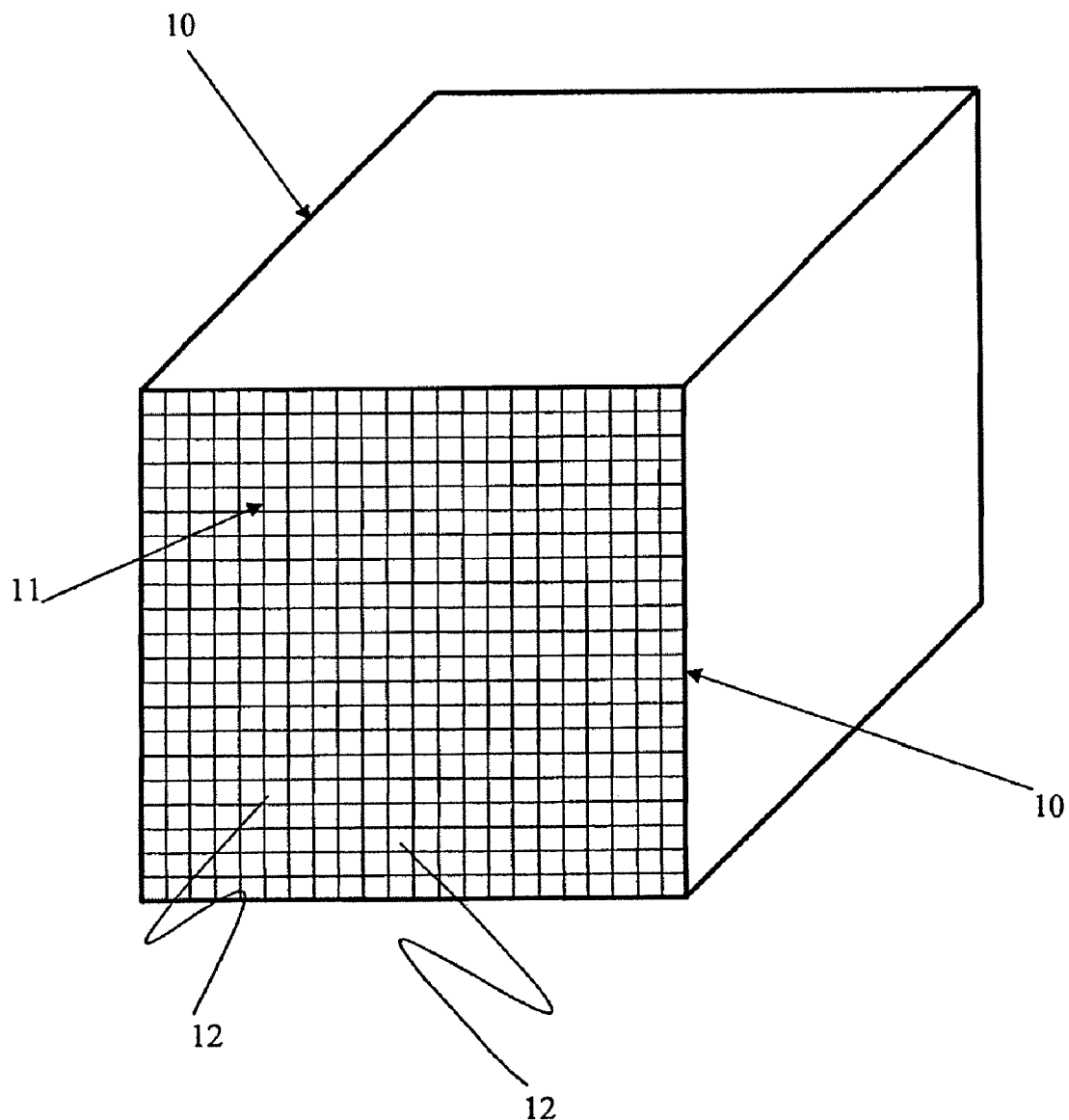
FIG. 1 illustrates a monolithic structural catalyst body according to an embodiment of the present invention.

The present invention provides compositions, systems, and methods for achieving high efficiencies of nitrogen oxide removal from exhaust gases while minimizing ammonia slip and sulfur dioxide oxidation.

In one embodiment, the present invention provides a composition comprising a monolithic structural catalyst body comprising a uniform composition, the uniform composition comprising 50-99.9% by weight an inorganic oxide composition and a catalytically active metal functional group comprising ruthenium. In some embodiments, the uniform chemical composition comprises at least 0.01% by weight a catalytically active metal group comprising ruthenium. In some embodiments, the uniform composition comprises from about 0.01% to about 5% by weight a catalytically active metal functional group comprising ruthenium. In other embodiments, the uniform composition comprises greater than 1% to about 5% by weight a catalytically active metal functional group comprising ruthenium. In a further embodiment, the uniform composition comprises from about 0.01% to 0.2% or from 0.6% to 0.9% by weight a catalytically active metal functional group comprising ruthenium. In one embodiment, the uniform composition comprises greater than about 5% by weight or less than about 0.01% by weight a catalytically active metal functional group comprising ruthenium.

Monolithic structural catalyst bodies, according to embodiments of the present invention, comprise an outer peripheral wall and a plurality of inner partition walls arranged within the outer peripheral wall. The inner partition walls define a cell opening size and delineate a plurality of flow channels, which extend longitudinally through the catalyst body. The outer peripheral and inner partition walls are formed from a uniform composition comprising 50-99.9% by weight an inorganic oxide composition and at least 0.01% by weight a catalytically active metal functional group comprising ruthenium. In some embodiments, the uniform composition comprises from about 0.01% to about 5% by weight a catalytically active metal functional group comprising ruthenium. Moreover, in one embodiment, the uniform chemical composition comprises 70-95% by weight an inorganic oxide. Inorganic oxides suitable for use in monolithic structural catalyst bodies of the present invention include, but are not limited to, titania ($TiO_2$), alumina ($Al_2O_3$), zirconia ($ZrO_2$), and/or mixtures thereof.

In some embodiments, the catalytically active metal functional group further comprises metals in addition to ruthenium, including, but not limited to, vanadium pentoxide ($V_2O_5$), tungsten oxide ($WO_3$), molybdenum oxide ($MoO_3$), promoted titanium (Ti) species, platinum group metals, gold, silver, iridium, cerium, other transition and noble metals, and/or mixtures thereof. In some embodiments, the additional metals are part of the uniform composition used to form the outer peripheral and inner partition walls. In other embodiments, catalytic material comprising the additional metals can be coated or deposited onto at least one surface of the outer peripheral wall and/or inner partition walls. The depositing of catalytic material comprising additional metals in or on the inner partition walls can be accomplished by aqueous impregnation, dip coating, washcoating, chemical vapor deposition, spraying of droplets, or other suitable techniques including any surface pre-treatment or post-treatments needed such as treatment with acid solution or thermal post-treatment.

When comprising additional metals, the catalytically active metal functional group, in some embodiments, comprises 1-30% by weight of the structural catalyst body. In other embodiments, when comprising additional metals, the catalytically active metal functional group comprises 5-15% by weight or 10% to 20% by weight of the structural catalyst body.

In an embodiment, monolithic structural catalyst bodies of the present invention have a cell opening size of at least 5.5 mm. In another embodiment, structural catalyst bodies have a cell opening size of at least 6.0 mm. Structural catalyst bodies, according to some embodiments, additionally comprise hydraulic diameter of at least 145 mm and a transverse compressive strength of at least 1.5 kg/cm². In a further embodiment, the hydraulic diameter can range from 145 mm to 160 mm. In a still further embodiment the hydraulic diameter can range from 152 mm to 154 mm.

In another embodiment, monolithic structural catalyst bodies comprise an open frontal area greater than 80%. In a further embodiment, the structural catalyst body comprises a cell density of at least 2.05 cells/cm². In some embodiments, monolithic structural catalyst bodies of the present invention comprise a macroporosity greater than 0.05 cc/g in pores of diameter ranging from 600 to 5,000 Angstroms. Moreover, in some embodiments the cell opening size can be at least 6.3 mm. In some embodiments, a monolithic structural catalyst bodies comprises an open frontal area greater than or equal to 82%.

A monolithic structural catalyst body of the present invention may be produced by mixing up to 50-99.9% by weight an inorganic oxide composition, or a precursor which yields an inorganic oxide composition and at least 0.01% by weight a catalytically active metal functional group comprising ruthenium, or a precursor which yields a catalytically active metal functional group comprising ruthenium. In some embodiments, the catalytically active metal functional group comprising ruthenium can be added directly to the inorganic oxide composition.

In other embodiments, the catalytically active metal functional group comprising ruthenium can be associated with support particles, such as titanium oxide and/or silicon oxide support particles, prior to mixing with the inorganic composition of the structural catalyst body. The support particles, in some embodiments, are coated with the catalytically active metal functional group comprising ruthenium. In other embodiments, the support particles are impregnated with the catalytically active metal functional group comprising ruthenium. Once associated, the support particles and catalytically active metal functional group comprising ruthenium are mixed with the inorganic oxide composition of the structural catalyst body. As a result of the mixing, the support particles and associated catalytic material become imbedded and uniformly dispersed in the inorganic oxide composition.

In some embodiments, as provided herein, the catalytically active metal functional group may further comprise metals in addition to ruthenium including vanadium pentoxide ($V_2O_5$), tungsten oxide ($WO_3$), molybdenum oxide ($MoO_3$), promoted (Ti) titanium species, platinum group metals, gold, silver, iridium, cerium, other transition and noble metals, and/or mixtures thereof. The inorganic oxide composition includes, but is not limited to, titania ($TiO_2$), alumina ($Al_2O_3$), zirconia ($ZrO_2$), and/or mixtures thereof.

In some embodiments, the additional metals are part of the uniform composition which forms the structural catalyst body. In such embodiments, the additional metals can be added directly to the inorganic oxide composition or can be associated with support particles in a manner consistent with that described for ruthenium above. In a further embodiment, the additional metals can be incorporated into the structural catalyst body as part of a coating applied to a surface of the catalyst body or impregnated throughout the catalyst body.

The resulting catalytic mixture can be kneaded into a clay-like substance and subsequently extruded from an extrusion molding machine to form a honeycomb-like monolithic catalyst structure comprising the outer partition wall, inner partition walls and longitudinal flow channels.

In some embodiments, when the monolithic structural catalyst body is extruded, the extrusion formulation can comprise any number of peptizing agents, binding agents, extrusion aids, lubricants, plasticizers, reinforcement agents, and the like to assist in the extrusion process and/or generate the desired structural and pore properties for an intended application. Examples of materials that may be included in an extrusion formula include, but are not limited to, glass fibers or strands, silicon carbide fibers, inorganic acids (e.g. phosphoric acid, nitric acid, etc.) organic acids (e.g. acetic acid, citric acid, formic acid, etc.), salts of organic acids (e.g. ammonium formate, ammonium acetate, ammonium citrate, etc.) cellulose compounds, starches, polyethylene oxide, stearic alcohols, alcohols, graphite, stearic acid, amines, oils, fats, and polymers. The extruded product may subsequently be dried or thermally treated. Moreover, in some embodiments, the extruded product may be subsequently deposited as described herein with additional catalyst material including metals such as a platinum group metal or other noble metal.

The extrusion system may include extruder machines, a filter or screen, and an extrusion die. The filter or screen may be utilized to facilitate passage of the mixture through the die, for example to reduce clogging of the die, without removing filler, binders, and reinforcement aids that provide advantageous product properties. The extruded product may subsequently be dried or thermally treated.

It is generally desirable, when extruding embodiments of the present invention to use sufficient energy to achieve intimate mixing of the compositional ingredients while minimizing additional energy that may have an adverse impact on particle packing characteristics that provide advantageous product properties.

Additional energy is utilized in the mixing equipment to increase form-stability, and in the extrusion system to move the extrusion mixture through the extruder machines, filter or screen and die. As set forth above, lubricants and extrusion aids may be utilized in the starting composition for the catalyst body to minimize this additional energy. Other means of reducing additional energy known in the art, include maximizing mixer and extruder efficiency and minimizing wall friction in the screen and die.

FIG. 1 illustrates a monolithic structural catalyst body according to one embodiment of the present invention. The monolithic structural catalyst of FIG. 1 displays a catalytically active outer peripheral wall 10 and a plurality of catalytically active inner partition walls 11. The inner partition walls 11 define a plurality of flow channels or cells 12 which extend longitudinally through the monolithic structural catalyst body for receiving exhaust gases.

Monolithic structural catalyst bodies of the present invention are operable to perform catalytic decomposition of ammonia and/or catalytic reduction of nitrogen oxides in exhaust gases. In some embodiments, monolithic structural catalyst bodies of the present invention selectively decompose ammonia in an exhaust gas.

As described herein, one method of increasing NOx reduction efficiency is to provide a $NH_3/NOx$ molar ratio in excess of equivalence. Providing a $NH_3/NOx$ molar ratio in excess of equivalence at the inlet of a conventional SCR catalyst, however, leads to unacceptable ammonia slip at the outlet of the catalyst. In some embodiments, providing a $NH_3/NOx$ molar ratio in excess of equivalence with structural catalyst of the present invention, however, does not result in unacceptable slip at the outlet of the catalyst. In being operable to conduct both selective catalytic ammonia decomposition and catalytic reduction of nitrogen oxides, a structural catalyst body of the present invention catalytically decomposes ammonia in excess of equivalence while performing catalytic reduction of nitrogen oxides in the exhaust gas. As a result, nitrogen oxide removal efficiencies are increased by using a $NH_3/NOx$ molar ratio in excess of equivalence without significant increases or no increase in ammonia slip at the outlet of the catalyst layer.

Additionally, when the $NH_3/NOx$ molar ratio in an exhaust gas is less than equivalence, monolithic structural catalyst bodies of the present invention substantially decrease and, in some cases, do not perform catalytic ammonia decomposition thereby allowing ammonia to be consumed in the catalytic reduction of nitrogen oxides. Such behavior permits monolithic structural catalyst bodies of the present invention to selectively decompose ammonia in an exhaust gas as a function of $NH_3/NOx$ molar ratio.

In another aspect the present invention provides systems for removing nitrogen oxides from an exhaust gas. In one embodiment, a system for removing nitrogen oxides from an exhaust gas comprises an ammonia decomposition catalyst layer and a nitrogen oxide reduction catalyst layer downstream of the ammonia decomposition layer. Ammonia decomposition layers of systems of the present invention comprise at least one monolithic structural catalyst body of the present invention as provided hereinabove. In some embodiments, ammonia decomposition layers comprise a plurality of monolithic structural catalyst bodies.

In some embodiments of systems of the present invention for removing nitrogen oxides from an exhaust gas, there is also provided at least one addition point of an ammonia-containing compound upstream of the ammonia decomposition and nitrogen oxide catalyst layers. The addition of an ammonia-containing compound upstream of one or more catalyst layers of the present invention provides a source of ammonia ($NH_3$) reductant for catalytic reduction of nitrogen oxides. In some embodiments, the ammonia-containing compound is ammonia ($NH_3$). In other embodiments, the ammonia-containing compound comprises any other chemical compound containing nitrogen that can decompose or react to form ammonia prior to contact with the catalyst or upon contact with the catalyst, including but not limited to urea [$CO(NH_2)_2$], cyanuric acid [2,4,6-trihydroxy-1,3,5-triazine], or isocyanic acid [HNCO]. The ammonia-containing compound, in some embodiments, comprises combinations of ammonia and other ammonia-containing compounds, and may be added in any form including aqueous mixtures. In some embodiments, the ammonia-containing compound may comprise excess ammonia from upstream selective non-catalytic reduction (SNCR) or selective auto-catalytic reduction (SACR) techniques, optionally with additional ammonia-containing compound.

In some embodiments of the present invention, an ammonia-containing compound is added upstream at one or more points, such as addition to the fuel prior to combustion, injection into a fuel combustion process, or injection downstream of the combustion process. Addition of the ammonia-containing compound downstream of the combustion process may be within a heat recovery section downstream of the combustion process, or may be injected downstream of a heat recovery section. The ammonia-containing compound may be added as a single stream or as multiple streams at any process location, such as an ammonia injection grid or injection lances. The rate of addition of any stream of ammonia-containing compound at any process location may be set to achieve low levels of heterogeneity in concentration of ammonia, nitrogen oxides, or molar ratio of ammonia to nitrogen oxides at the catalyst location.

In some embodiments, an ammonia-containing compound is added upstream of one or more catalyst layers to produce a NH$_3$/NOx molar ratio in excess of reaction equivalence at the inlet of the catalyst. In some embodiments, an ammonia-containing compound is added upstream of a catalyst layer to produce a NH$_3$/NOx molar ratio at the inlet of the catalyst ranging from greater than 1.0 to about 2.0 or greater than 1.0 to about 1.5. In one embodiment, an ammonia-containing compound is added in an amount sufficient to produce a NH$_3$/NOx molar ratio at the inlet of the catalyst ranging from about 0.95 to about 1.5 or from about 1.5 to about 2.0. In another embodiment, an ammonia-containing compound is added in an amount sufficient to produce a NH$_3$/NOx molar ratio ranging from about 1.0 to about 1.4. In a further embodiment, ammonia-containing compound is added in an amount sufficient to produce a NH$_3$/NOx molar ratio at the inlet of the catalyst ranging from about 1.0 to about 1.2.

Moreover, in some embodiments, an ammonia-containing compound is added to an exhaust gas in systems and methods of the present invention in an amount sufficient to produce a NH$_3$/NOx molar ratio in excess of equivalence at one or more points within a catalyst layer. In some embodiments, an ammonia-containing compound is added in an amount sufficient to produce a NH$_3$/NOx molar ratio at one or more points within a catalyst layer ranging from greater than 1.0 to about 2.0 or from greater than 1.0 to about 1.5. In another embodiment, an ammonia-containing compound is added in an amount sufficient to produce a NH$_3$/NOx molar ratio at one or more points in a catalyst layer ranging from greater than 1.0 to about 1.3 or ranging from about 1.5 to about 2.0.

A system for removing nitrogen oxides from an exhaust gas, according to some embodiments, further comprises an additional nitrogen oxide reduction catalyst layer upstream of the ammonia decomposition catalyst layer.

Figure 2:
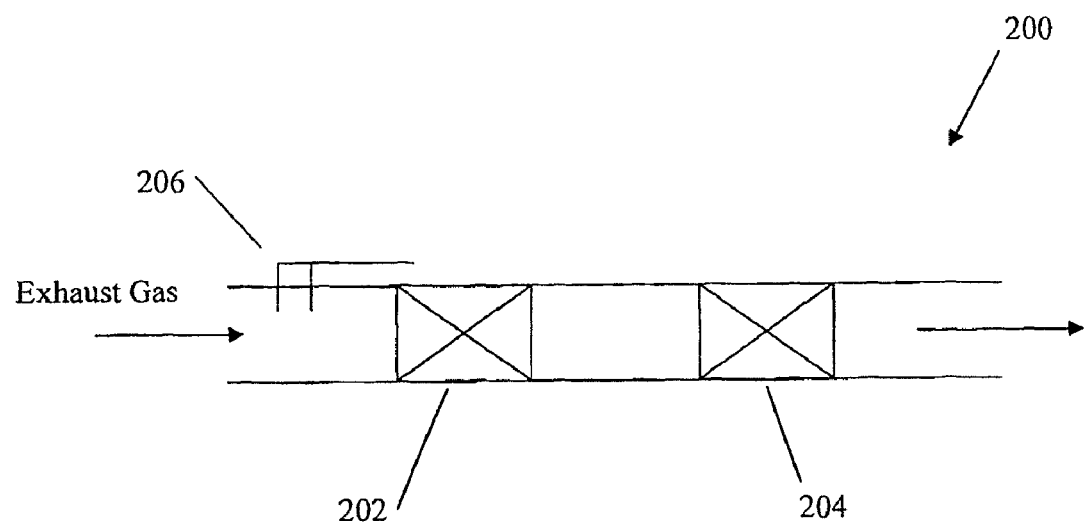
FIG. 2 illustrates a system for removing nitrogen oxides from an exhaust gas according to an embodiment of the present invention.

FIG. 2 illustrates a system for removing nitrogen oxides from an exhaust gas according to one embodiment of the present invention. The system (200) illustrated in FIG. 2 comprises an ammonia decomposition catalyst layer (202) furthermost upstream of the exhaust gas flow and a nitrogen oxide reduction catalyst layer (204) downstream of the ammonia decomposition catalyst layer (202). Addition points (206) of an ammonia-containing compound are provided upstream of the ammonia decomposition catalyst layer (202) and the nitrogen oxide reduction catalyst layer (204).

Figure 3:
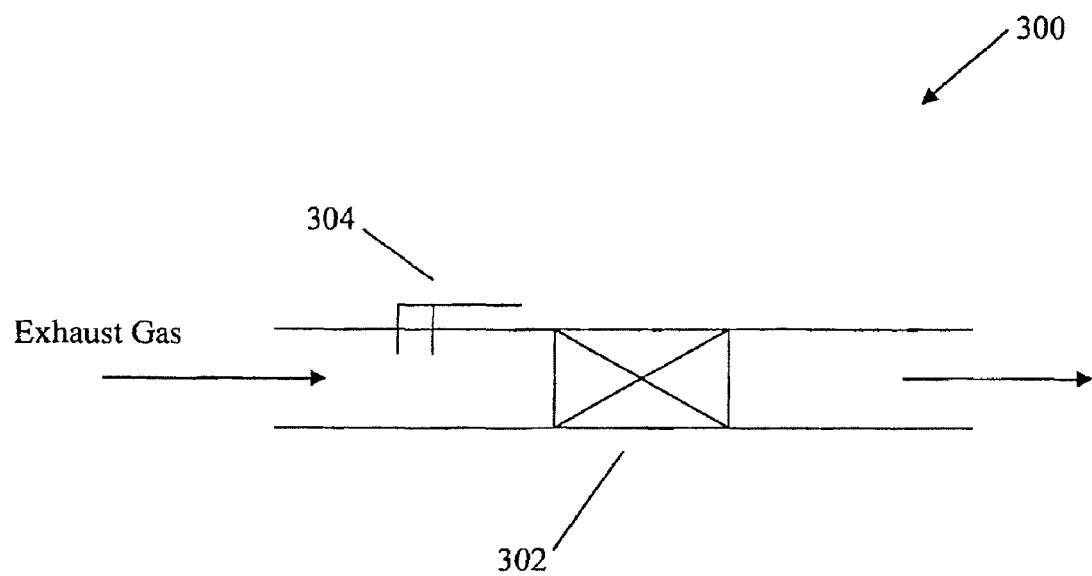
FIG. 3 illustrates a system for removing nitrogen oxides from an exhaust gas according to an embodiment of the present invention.

In some embodiments, a system for removing nitrogen oxides from an exhaust gas comprises a catalyst layer operable to effectuate both catalytic ammonia decomposition and catalytic nitrogen oxide reduction, thereby rendering additional downstream and/or upstream catalytic layers optional. FIG. 3 illustrates such a system for removing nitrogen oxides from an exhaust gas. The system (300) illustrated in FIG. 3 comprises a catalyst layer (302) operable to perform both catalytic ammonia decomposition and catalytic nitrogen oxide reduction. Addition points (304) for an ammonia-containing compound are located upstream of the catalyst layer (302).

Systems for removing nitrogen oxides from an exhaust gas, according to embodiments of the present invention, can display a nitrogen oxide removal efficiency of greater than 95%. In some embodiments, systems for removing nitrogen oxides from an exhaust gas can demonstrate a nitrogen oxide removal efficiency of greater than 97%. In one embodiment, systems for removing nitrogen oxides from an exhaust gas can demonstrate a nitrogen oxide removal efficiency greater than 99%.

In conjunction with nitrogen oxide removal efficiencies provided herein, systems for removing nitrogen oxides from an exhaust gas, in some embodiments, have an ammonia slip of less than 5 ppmvd. In other embodiments, systems for removing nitrogen oxides from an exhaust gas display an ammonia slip of less than 3 ppmvd. In a further embodiment, systems for removing nitrogen oxides from an exhaust gas demonstrate an ammonia slip of less than 2 ppmvd. In some embodiments, systems for removing nitrogen oxides from an exhaust gas provide minimal to no sulfur dioxide oxidation. In some embodiments, systems for removing nitrogen oxides from an exhaust gas can comprise mercury oxidation functionality.

In another aspect, the present invention provides methods of removing nitrogen oxides from an exhaust gas. In one embodiment, a method of removing nitrogen oxides from an exhaust gas comprises providing an ammonia decomposition catalyst layer, providing a nitrogen oxide reduction catalyst layer downstream of the ammonia decomposition catalyst layer, adding an ammonia-containing compound upstream of the ammonia decomposition catalyst layer and nitrogen oxide reduction catalyst layer in an amount not less than the stoichiometric reaction equivalent of nitrogen oxides in the exhaust gas, and passing the exhaust gas through the ammonia decomposition catalyst layer and through the nitrogen oxide reduction catalyst layer. In some embodiments, at least one additional nitrogen oxide reduction catalyst layer can be placed upstream of the ammonia decomposition catalyst layer.

An ammonia decomposition catalyst layer, in embodiments of methods the present invention, comprises at least one monolithic structural catalyst body as described hereinabove. In some embodiments, the ammonia decomposition catalyst layer comprises a plurality of monolithic structural catalyst bodies of the present invention.

In another embodiment, a method of removing nitrogen oxides from an exhaust gas comprises providing a first catalyst layer, catalytically decomposing ammonia in the exhaust gas and catalytically reducing nitrogen oxides in the exhaust gas by passing the exhaust gas through the first catalyst layer, wherein an ammonia containing compound is added upstream of the first catalyst layer in an amount not less than the stoichiometric reaction equivalent of nitrogen oxides in the exhaust gas. The first catalyst layer, according to the present embodiment, comprises at least one monolithic structural catalyst body of the present invention. In some embodiments, the first catalyst layer comprises a plurality of monolithic structural catalyst bodies of the present invention. In some embodiments, a method further comprises providing at least one additional nitrogen oxide reduction catalyst layer downstream of the first catalyst layer and flowing the exhaust gas through the at least one additional nitrogen oxide reduction catalyst layer.

In another embodiment, a method of removing nitrogen oxides from an exhaust gas comprises providing a first catalyst layer, adding an ammonia-containing compound to the exhaust gas upstream of the first catalyst layer in excess of the stoichiometric reaction equivalent of nitrogen oxides in the exhaust gas, flowing the exhaust gas through the first catalyst layer, selectively catalytically decomposing ammonia in excess of the stoichiometric reaction equivalent of nitrogen oxides in the exhaust gas, and catalytically reducing the nitrogen oxides by reaction with ammonia not selectively catalytically decomposed. In some embodiments, the amount of ammonia exiting the first catalyst layer is less than about 5 ppmvd. In other embodiments, the amount of ammonia exiting the first catalyst layer is less than about 3 ppmvd. In a further embodiment, the amount of ammonia exiting the first catalyst layer is less than about 2 ppmvd. Moreover, in some embodiments, a method further comprises providing at least one additional nitrogen oxide reduction catalyst layer downstream of the first catalyst layer and flowing the exhaust gas through the at least one additional nitrogen oxide reduction catalyst layer.

In a further embodiment, a method of removing nitrogen oxides from an exhaust gas comprises providing a first catalyst layer, adding an amount of ammonia-containing compound to the exhaust gas, flowing the exhaust gas through the first catalyst layer wherein the amount of ammonia-containing compound added produces a $NH_3/NOx$ molar ratio in excess of equivalence at one or more points in the first catalyst layer, selectively catalytically decomposing ammonia in excess of equivalence at the one or more points in the first catalyst layer, and catalytically reducing nitrogen oxides by reaction with ammonia not selectively catalytically decomposed. In some embodiments, the amount of ammonia exiting the first catalyst layer is less than about 5 ppmvd. In other embodiments, the amount of ammonia exiting the first catalyst layer is less than about 3 ppmvd. In one embodiment, the amount of ammonia exiting the first catalyst layer is less than about 2 ppmvd. In a further embodiment, a method further comprises providing at least one additional nitrogen oxide reduction catalyst layer downstream of the first catalyst layer and flowing the exhaust gas through the at least one additional nitrogen oxide reduction catalyst layer.

In some embodiments, wherein at least one additional nitrogen oxide reduction catalyst layer is provided downstream of the first catalyst layer, the amount of ammonia in the exhaust gas exiting the at least one additional catalyst layer is less than about 5 ppmvd, less than about 3 ppmvd, or less than about 2 ppmvd.

As provided herein, according to some embodiments of methods of the present invention, an ammonia-containing compound is added upstream of the catalyst layer at one or more points, such as addition to the fuel prior to combustion, injection into a fuel combustion process, or injection downstream of the combustion process. The addition of the ammonia-containing compound downstream of the combustion process may be within a heat recovery section downstream of the combustion process or may be injected downstream of a heat recovery section. The ammonia-containing compound may be added as a single stream or as multiple streams at any process location, such as an ammonia injection grid or injection lances.

The rate of addition of any stream of ammonia-containing compound at any process location may be set to achieve low levels of heterogeneity in concentration of ammonia, nitrogen oxides, or molar ratio of ammonia to nitrogen oxides at the catalyst location. Moreover, the amount of ammonia added to an exhaust gas to achieve a desired $NH_3/NOx$ molar ratio can be determined by monitoring the nitrogen oxide concentration in the exhaust gas at one or a plurality of points in the flow path of the exhaust gas. In one embodiment, for example, the nitrogen oxide content of an exhaust gas is measured upstream of a catalyst layer and ammonia is added to achieve a desired $NH_3/NOx$ molar ratio based on the result of the measurement. In another embodiment, the nitrogen oxide content of an exhaust gas is measured downstream of a catalyst layer, and ammonia is added to achieve a desired $NH_3/NOx$ molar ratio based on the result of the measurement.

In some embodiments, an ammonia-containing compound is added in systems and methods of the present invention in an amount sufficient to produce a $NH_3/NOx$ molar ratio at the inlet of a catalyst layer having a value not less than equivalence (1.0).

In some embodiments, an ammonia-containing compound is added upstream of one or more catalyst layers to produce a $NH_3/NOx$ molar ratio in excess of reaction equivalence at the inlet of the catalyst. In some embodiments, an ammonia-containing compound is added upstream of a catalyst layer to produce a $NH_3/NOx$ molar ratio at the inlet of the catalyst ranging from greater than 1.0 to about 2.0 or greater than 1.0 to about 1.5. In one embodiment, an ammonia-containing compound is added in an amount sufficient to produce a $NH_3/NOx$ molar ratio at the inlet of the catalyst ranging from about 0.95 to about 1.5 or from about 1.5 to about 2.0. In another embodiment, an ammonia-containing compound is added in an amount sufficient to produce a $NH_3/NOx$ molar ratio ranging from about 1.0 to about 1.4. In a further embodiment, ammonia-containing compound is added in an amount sufficient to produce a $NH_3/NOx$ molar ratio at the inlet of the catalyst ranging from about 1.0 to about 1.2.

Moreover, in some embodiments, an ammonia-containing compound is added to an exhaust gas in systems and methods of the present invention in an amount sufficient to produce a $NH_3/NOx$ molar ratio in excess of equivalence at one or more points within a catalyst layer. In some embodiments, an ammonia-containing compound is added in an amount sufficient to produce a $NH_3/NOx$ molar ratio at one or more points within a catalyst layer ranging from greater than 1.0 to about 2.0 or from greater than 1.0 to about 1.5. In another embodiment, an ammonia-containing compound is added in an amount sufficient to produce a $NH_3/NOx$ molar ratio at one or more points in a catalyst layer ranging from greater than 1.0 to about 1.3 or ranging from about 1.5 to about 2.0.

In some embodiments, a $NH_3/NOx$ molar ratio in excess of equivalence at one or more points within a catalyst layer can be achieved by the addition of an ammonia-containing compound to an exhaust gas in an amount less than or equal to the stoichiometric reaction equivalent of nitrogen oxides in the exhaust gas. In another embodiment, a $NH_3/NOx$ molar ratio in excess of equivalence at one or more points within a catalyst layer can be achieved by the addition of an ammonia containing compound to an exhaust gas in an amount greater than the stoichiometric reaction equivalent of nitrogen oxides in the exhaust gas.

Selective catalytic decomposition of ammonia in excess of the stoichiometric equivalence of the nitrogen oxides in the exhaust gas, according to methods of the present invention, reduces ammonia slip at the exit of the catalyst layer. Moreover, the selective catalytic decomposition of ammonia in excess of the stoichiometric equivalence, in some embodiments of methods of the present invention, permits the use of excess ammonia to increase the efficiency of nitrogen oxide reduction without the concomitant increase in ammonia slip at the exit of a catalyst layer.

Catalyst layers of systems and methods of the present invention comprise at least one monolithic structural catalyst body as described herein. In some embodiments, catalyst layers of systems and methods of the present invention comprise a plurality of monolithic structural catalyst bodies operable to effectuate ammonia decomposition and/or selective catalytic reduction of nitrogen oxides.

Systems and methods for removing nitrogen oxides from exhaust gases, according to embodiments of the present invention, can demonstrate nitrogen oxide removal efficiencies of at least 95%. In some embodiments, systems and methods of the present invention can display a nitrogen oxide removal efficiency of at least 97%. In one embodiment, systems and methods of the present invention can display a nitrogen oxide removal efficiency of at least 99%.

In some embodiments of the present invention, exhaust gases treated with systems and methods described herein further comprise a sulfur trioxide content. Systems and methods of the present invention for removing nitrogen oxides from an exhaust gas, in some embodiments, result in no increase or substantially no increase of the sulfur trioxide content of the exhaust gas through the oxidation of sulfur dioxide. Moreover, in some embodiments, methods for removing nitrogen oxides from an exhaust gas can comprise mercury oxidation functionality.

The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention.

EXAMPLE 1

Monolithic Structural Catalyst Body of the Present Invention

A honeycomb-like monolithic structural catalyst body of the present invention was produced in lab-scale manufacturing facilities according to methods provided hereinabove, including the mixing of ingredients, extrusion to a honeycomb shape, drying, and calcination. The catalytic body displayed a catalyst composition comprising an inorganic oxide content of 85% titania ($TiO_2$), 9% catalytically active metals composition comprising tungsten trioxide ($WO_3$), 0.3% ruthenium, and 5.7% other components comprising $SiO_2$, CaO, $Al_2O_3$, $Fe_2O_3$, $SO_4$, and minor species. The flow channels enclosed by the inner partition walls and outer peripheral wall were nominally square in cross-sectional profile with a cell size of 6.3 mm. The pitch of monolithic catalyst body was 7.1 mm.

The monolithic structural catalyst was subsequently tested for the selective catalytic reduction of nitrogen oxides in a gas. Performance testing of the structural catalyst for the selective reduction of nitrogen oxides was conducted in accordance with accepted industry standards. The catalytic performance was measured in a micro-reactor at a temperature of 380° C. in a simulated gas stream consisting of approximately 3.5% oxygen on a dry basis, 10% water vapor, 350 ppmvd nitrogen monoxide, 300-475 ppmvd ammonia, and balance $N_2$.

Concentrations of ammonia, nitrogen oxides, and sulfur trioxide were measured at points along the structural catalyst including at the inlet and the outlet. The catalytic performance was thereby measured as a function of residence time of gas along the length of the catalyst layer, such residence time being expressed as the reciprocal of area velocity which ranged from zero at the catalyst inlet to approximately 0.06 hrs-$m^2$/$Nm^3$ at the catalyst outlet where $m^2$ is the geometric surface area of the exposed surfaces of the catalyst in contact with the gas flow, and where $Nm^3$ is normal cubic meters of gas flow per hour.

Figure 4:
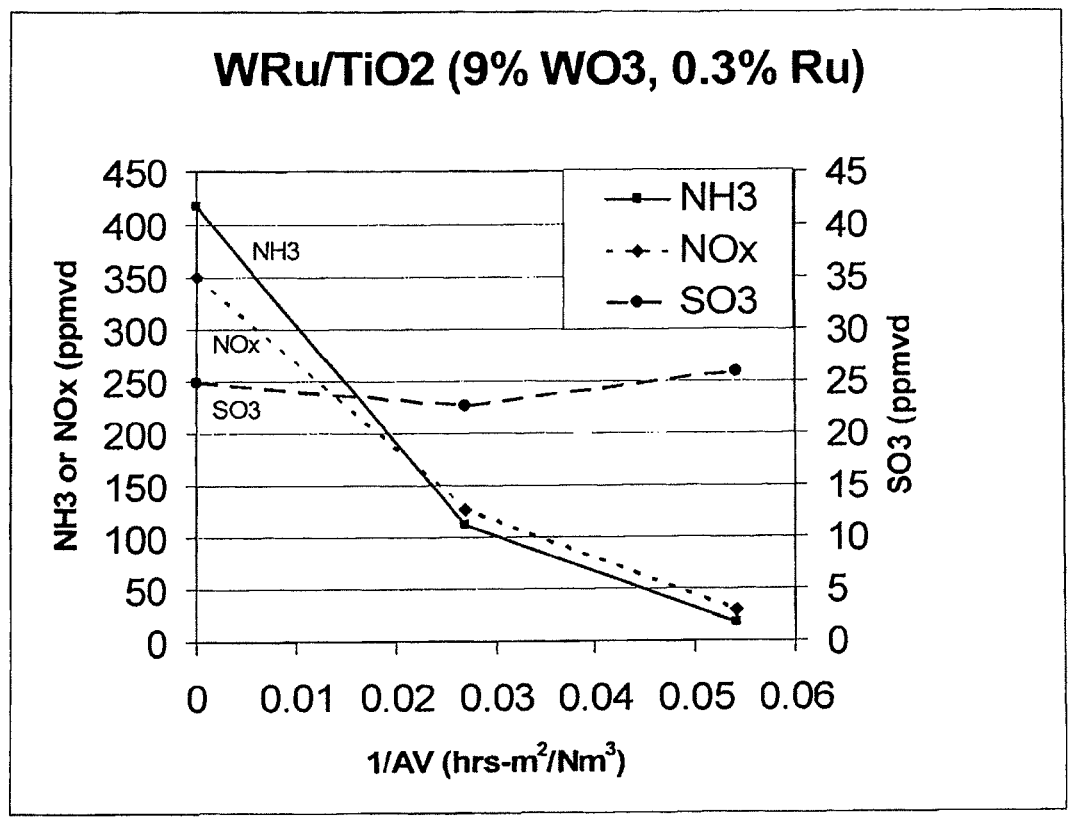
FIG. 4 illustrates nitrogen oxide removal, selective catalytic ammonia decomposition, and sulfur dioxide oxidation in an exhaust gas as a function of residence time in a catalyst layer according to an embodiment of the present invention.

FIG. 4 illustrates the results of the testing. As displayed in FIG. 4, the monolithic structural catalyst body demonstrated selective catalytic ammonia decomposition and catalytic nitrogen oxide reduction. The slope of ammonia concentration from 0 to about 0.03 hrs-$m^2$/$Nm^3$ exceeded the slope of NOx concentration for the same residence time period indicating that ammonia in excess of the stoichiometric reaction equivalent of the nitrogen oxides was being selectively catalytically decomposed. The $NH_3$/NOx molar ratio at the inlet of the monolithic structural catalyst body was about 1.2. As the concentration of ammonia approached the NOx concentration as a result of the selective catalytic decomposition, the slope of the ammonia concentration flattened to match the slope of the NOx concentration. The flattening of the ammonia concentration slope to match the NOx concentration slope indicated a reduction in the selective catalytic decomposition of the ammonia with the ammonia being consumed in the catalytic reduction nitrogen oxides in a 1:1 ratio as shown in formulas (1) and (2) hereinabove.

The selective catalytic decomposition of the ammonia in excess of the stoichiometric reaction equivalent of the nitrogen oxides in the exhaust gas coupled with the 1:1 reaction with the nitrogen oxides in the exhaust gas allowed excess ammonia to be supplied in the catalytic reduction of nitrogen oxides without the concomitant release of unacceptable ammonia levels at the outlet of the monolithic structural catalyst body.

Additionally, the monolithic structural catalyst body demonstrated substantially no sulfur dioxide oxidation when catalytically removing nitrogen oxides from the exhaust gas. As shown in FIG. 4, sulfur trioxide concentration remained steady indicating minimal to no oxidation of sulfur dioxide in the exhaust gas by the monolithic structural catalyst body.

It is to be understood that the foregoing description and specific embodiments are merely illustrative of the present invention and the principles thereof, and that various modifications and additions may be made to the present invention by those skilled in the art, without departing from the spirit and scope of the invention.

That which is claimed is:

1. A system for removing nitrogen oxides from an exhaust gas comprising:
   one or more addition points for an ammonia containing compound; and
   a catalyst layer comprising monolithic structural catalyst bodies, at least one of the monolithic structural catalyst bodies formed of a uniform composition comprising 50-99.9% by weight an inorganic oxide composition and a catalytically active metal functional group comprising ruthenium.

2. The system of claim 1, wherein the monolithic structural catalyst body comprises the ruthenium in an amount of at least about 0.01% by weight.

3. The system of claim 1, wherein the monolithic structural catalyst body comprises the ruthenium in an amount ranging from about 0.01% by weight to about 0.2% by weight.

4. The system of claim 1, wherein the monolithic structural catalyst body comprises the ruthenium in an amount ranging from about 0.6% by weight to about 0.9% by weight.

5. The system of claim 1, wherein the monolithic structural catalyst body comprises the ruthenium in an amount greater than about 1% by weight to about 5% by weight.

6. The system of claim 1, wherein the monolithic structural catalyst body comprises the ruthenium in an amount greater than about 5% by weight.

7. The system of claim 1, wherein the catalytically active metal functional group further comprises a noble metal.

8. The system of claim 1, wherein the catalytically active metal functional group further comprises a platinum group metal, vanadium, tungsten, molybdenum, promoted titanium species, gold, silver, iridium or cerium or mixtures thereof.

9. The system of claim 1, wherein the catalytically active metal functional group further comprises vanadium, tungsten or molybdenum or mixtures thereof.

10. The system of claim 9, wherein the catalytically active metal functional group further comprises a noble metal.

11. The system of claim 1, wherein the ammonia containing compound comprises ammonia or a compound that decomposes to form ammonia prior to or upon contact with the monolithic structural catalyst body.

12. The system of claim 1 wherein a plurality of the monolithic structural catalyst bodies are formed of the uniform composition comprising 50-99.9% by weight the inorganic oxide composition and the catalytically active metal functional group comprising ruthenium.

13. The system of claim 12, wherein the monolithic structural catalyst bodies comprise an outer peripheral wall and a plurality of inner partition walls.

14. The system of claim 12, wherein the monolithic structural catalyst bodies have an open frontal area greater than 80%.

15. The system of claim 12, wherein the monolithic structural catalyst bodies have an open frontal area greater than 82%.

16. The system of claim 12, wherein the monolithic structural catalyst bodies have a cell density of at least 2.05 cells/$cm^2$.

17. The system of claim 12, wherein the monolithic structural catalyst bodies have a hydraulic diameter greater than or equal to 145 mm.

18. The system of claim 12 having a nitrogen oxide removal efficiency greater than 95% and an ammonia slip less than 5 ppmvd.

19. The system of claim 16 having a nitrogen oxide removal efficiency greater than 97% and an ammonia slip less than 3 ppmvd.

20. The system of claim 12 comprising mercury oxidation functionality.

21. The system of claim 1, wherein the monolithic structural catalyst body is impregnated with additional catalytic material.

22. The system of claim 1, wherein the monolithic structural catalyst body is washcoated with additional catalytic material.

23. The system of claim 1, wherein the monolithic structural catalyst body is dip coated with additional catalytic material.

* * * * *